United States Patent
Carnahan

[11] 3,724,744
[45] Apr. 3, 1973

[54] CARD HOLDER FOR METER READERS
[76] Inventor: William M. Carnahan, 1004 Maple, Sand Springs, Okla. 74014
[22] Filed: Nov. 26, 1971
[21] Appl. No.: 202,141

[52] U.S. Cl. ..................................231/2 E, 221/259
[51] Int. Cl. .............................................B68b 11/00
[58] Field of Search..........231/2 E; 281/4 S; 221/259

[56] References Cited
UNITED STATES PATENTS

| | | | |
|---|---|---|---|
| 2,304,065 | 12/1942 | Wright | 231/2 E |
| 3,355,066 | 11/1967 | Schlichting | 281/45 X |

Primary Examiner—Louis G. Mancene
Assistant Examiner—I. N. Eskovitz
Attorney—Head & Johnson

[57] ABSTRACT

An improved card holder for meter readers including a housing having a portion thereof of dimensions to hold a stack of meter cards, the top of the housing having openings therein through which the user may write upon the upmost card in stack, a metallic member affixed to a portion of the exterior of the housing, a battery carried within the housing, high voltage producing means within the housing connected to the metallic member, and a switch connected between the battery and the high voltage means such that when the switch is turned on high voltage is applied to the metallic member to thereby enable the user to ward off an attacking animal.

4 Claims, 4 Drawing Figures

PATENTED APR 3 1973 3,724,744

CARD HOLDER FOR METER READERS

BACKGROUND, SUMMARY AND OBJECTS OF THE INVENTION

In order for utility companies to bill their customers for utility consumption, meters placed at each area of consumption must be periodically read. Most electric, water and gas utilities in the United States have employees who read meters each month. This requires the meter readers to go to each residence or business, receiving utility service to read the meters. Frequently the meters are in yards wherein homeowners keep dogs, as pets and as protection against intruders. One problem meter readers continually face is that of being attacked by dogs as they go about their job of reading meters.

Another problem faced by meter readers is that of maintaining the cards on which meter readings are to be placed in proper sequence so that the correct card is available at each successive address at which the meter reader stops. Others have provided card holders for receiving a stack of cards and have provided means wherein the cards may be written upon to record current meter readings. The present invention is intended to provide an improved card holder for meter readers and particularly, to provide a card holder characterized by improved means of holding cards in proper sequence for meter readers in an arrangement wherein meter reading may be easily placed upon the cards, and most important, including means for warding off the attack of animals.

It is therefore an object of this invention to provide an improved card holder for meter readers.

More particularly, an object of this invention is to provide an improved card holder for meter readers including improved means for storing cards for sequential use by meter readers.

Another object of this invention is to provide an improved card holder for meter readers including improved arrangement for hand and wrist support as meter readings are written on successive cards.

Another object of this invention is to provide an improved card holder for meter readers including means of warding off the attack of an animal.

Another object of this invention is to provide an improved card holder for meter readers including the combination of improved means for retaining cards, improved writing surfaces for the user, means for warding off the attack of animals, and a handle arrangement for easy transportation of the device, all encompassed in a single compact structure.

These objects, as well as others, will be fulfilled in the apparatus described in the following specification and claims, taken in conjunction with the attached drawings.

DESCRIPTION OF THE VIEWS

DETAILED DESCRIPTION

Figure 1:
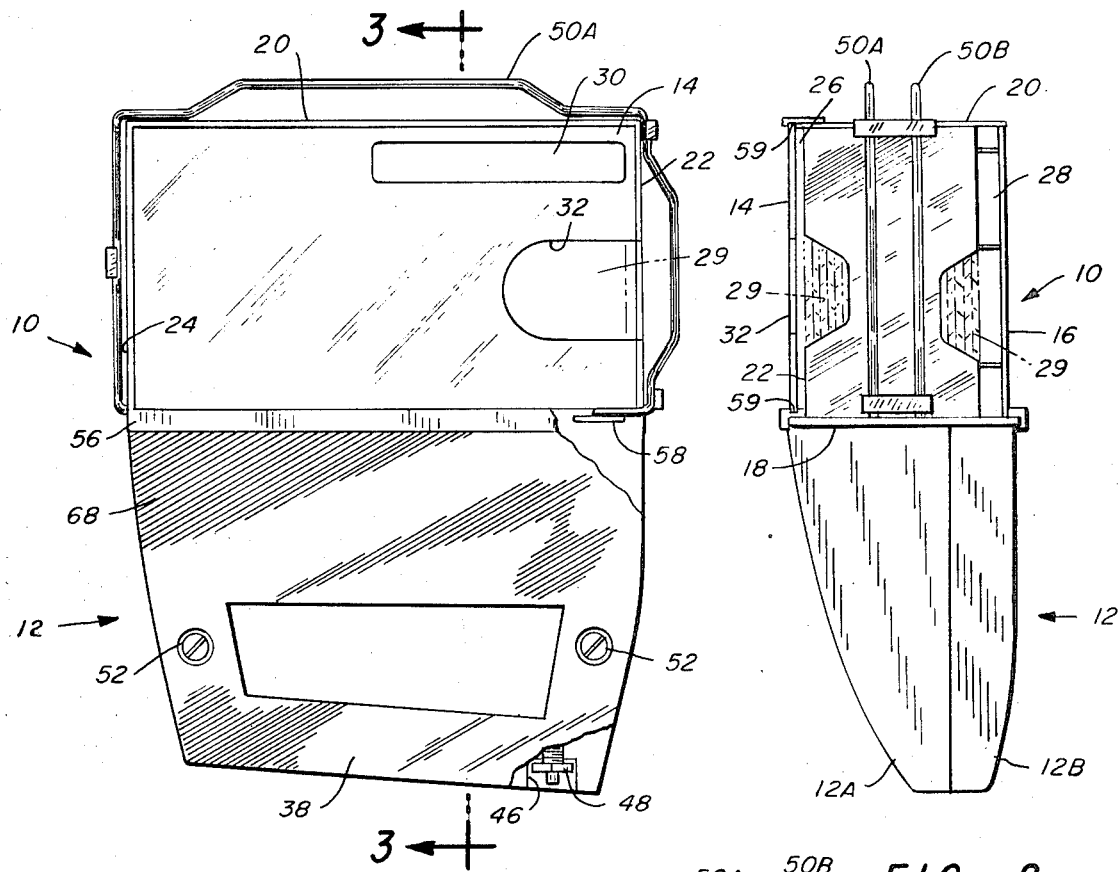
FIG. 1 is a top view of an improved card holder for meter readers.
Figure 2:
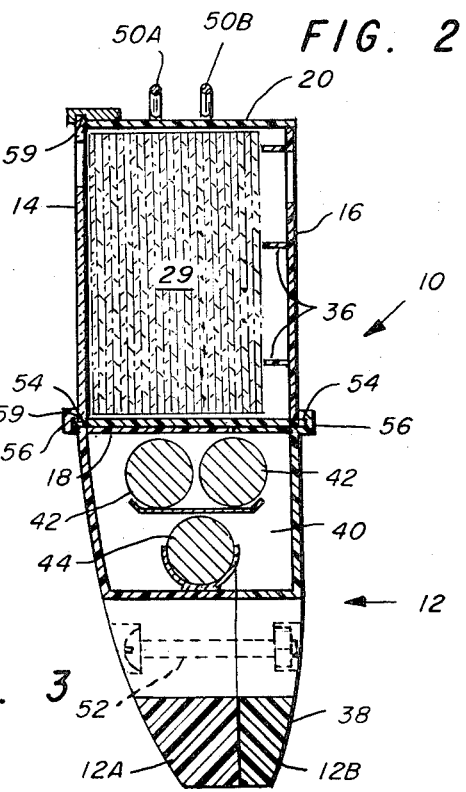
FIG. 2 is a view of one end of the improved card holder of this invention.
Figure 3:
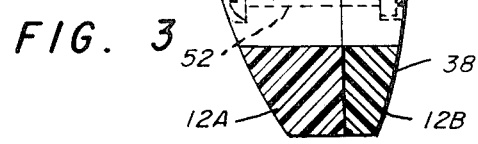
FIG. 3 is a cross-sectional view taken along the line 3—3 of FIG. 1, showing the internal arrangement of the improved card holder of this invention.

Referring to the drawings, and first to FIGS. 1, 2 and 3, an improved card holder of this invention is illustrated. The card holder includes a housing portion generally indicated by numeral 10 and a handle portion generally indicated by numeral 12. The housing portion includes a top 14, a bottom 16, a first side 18, a second side 20, a first end 22 and a second end 24. First end 22 includes an upper slot 26 and a lower slot 28. A stack of cards 29 is positioned within housing portion 10. The top 14 of the housing portion 10 includes a first opening 30 through which the meter reader inscribes the meter reading corresponding with the address of the top card. The position of slot 30 may vary according to the arrangement of the printing on the cards 19. A second slot 32 is used by the meter reader to slide out the top card after the meter reading has been inscribed thereon to expose the next card. Top 14 is preferably transparent to expose the address and other information to the meter reader or, is at least transparent in the portion thereof which the meter reader needs to see.

Positioned on the interior surface of bottom 16 are ridges 36 which hold the cards 19 slightly above lower slot 28 so that after a card is slipped into the lower slot 28 it will not be accidentally lost out through the slot. Affixed to the housing portion 10 at the first side 18 is handle portion 12. The handle portion includes a carrying handle 38 and provides a cavity 40 in which is stored batteries 42 and electrical apparatus 44. The handle 38 includes a recess 46 having a switch 48 therein, the switch being connected electrically by conductors (not shown) between the batteries 42 and electrical apparatus 44.

Affixed on the exterior of housing portion 10 are metallic members. In the preferred arrangement as illustrated, there are two spaced apart metallic members 50A and 50B electrically isolated from each other. The metallic member may be supported by insulating means or, the entire housing portion may be constructed of insulating material, such as plastic. Electrical apparatus 44 connects to the metallic members 50 when the apparatus is fully assembled. In the illustrated arrangement the handle portion 12 is composed of a first portion 12A and a second portion 12B held together by bolts 52. The two portions 12A and 12B may be separated from each other as a means of installing and replacing the electrical equipment 44 and batteries 42. In one means of removably affixing the handle portion 12 to body portion 10, the body portion 10 is provided with a ledge 54 along each parallel edge of first side 18. A handle portion 12 include lip portions 56 which slide over ledges 54. Thus, handle portion 12 may be slidably removed from body portion 10. To provide electrical communication between the electrical equipment 44 within handle portion 12 and metallic members 50 when the card holder is completely assembled, the handle portion 12 is provided with electrodes 58 (only one of which is seen in FIG. 1) which have electrical connection to the metallic elements 50A and 50B respectively.

To provide means for removing and inserting cards 29 top 14 is slidable in notches 59 in sides 18 and 20.

Figure 4:
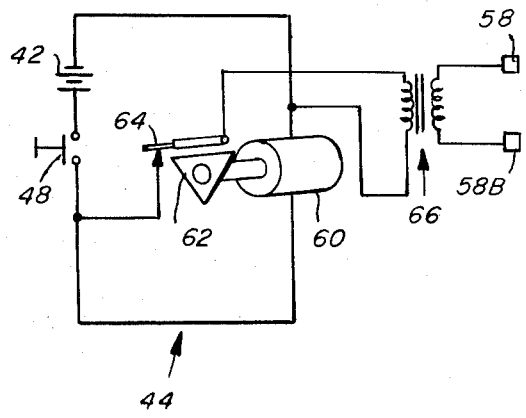
FIG. 4 is a wiring diagram of one arrangement for providing high voltage as used in the invention.

The electrical apparatus 44 may vary in many ways but generally is designed to provide high voltage to metallic conductors 50A and 50B when switch 48 is depressed. FIG. 4 shows a circuit diagram of one arrangement to accomplish this result. Batteries 42 are connected, when switch 48 is closed, to a motor 60. The motor 60, when energized, rotates a cam 62 which opens and closes a contact 64. A high ratio transformer 66 has the primary thereof in series with contact 64 and battery 42. The secondary of transformer 66 is connected to electrodes 58. Thus, when switch 48 is closed AC voltage is introduced into the primary of transformer 66 producing a high voltage in the secondary which is applied across electrodes 58 to metallic elements 50A and 50B.

The handle portion 12 is arranged such that it provides a relatively large flat surface 68 adjacent to the top 14 of the housing portion. Surface 68 provides a rest for the heel portion of the hand of the meter reader using the apparatus so that he may more comfortably write the meter reading in the card through first slot 30.

OPERATION

The apparatus is easily carried by the meter reader by means handle 38. FIG. 1 shows the apparatus in the position it takes when the user supports it with his left hand (if he is right handed), so that the right hand may be used for inserting a meter reading through slot 30. The flat surface 68 of handle portion 12 serves to support the hand of the writer to make writing more comfortable. After a meter reading is placed upon the top card of stack 29 the top card is slid from the housing portion by using the thumb inserted in the second slot 32. The card is then placed on the bottom of the stack through lower slot 28. This automatically exposes the next card on top of the stack to accept a meter reading. Between stops for taking reading the user carries the device by handle 38. In the event of an attach by an animal, such as a dog, the user depresses switch 48. This imposes a high voltage across metallic members 50A and 50B. When placed against a dog, or any other attacking animal, or even an attacking person, a painful shock is imposed. The shock is preferably of several thousand volts, and of low amperage. Therefore the shock is painful but not lethal. Such high voltage shock is exceedingly effective in immediately stopping the attack of a dog or other animal.

Obviously many changes may be made in the structure without departing from the invention. Housing portion 10 and handle portion 12 may be affixed to each other as in integral arrangement with access to batteries 42 provided by a removable door. The circuit arrangement for producing the high voltage shock may be changed in many ways. For instance, a vibrator may be used in place of motor 60, or a solid state oscillating circuit may be utilized to provide the AC voltage to transformer 60. When an arrangement is employed wherein the housing portion 10 and handle portion 12 are affixed to each other the necessity for electrodes 58 would be eliminated. All of such alternate arrangements are within the scope of this invention.

It is understood that the invention is not limited by the illustrated embodiment set forth herein for purposes of exemplifying one form of the invention, but the invention is to be limited only by the scope of the attached claim or claims, including the full range of equivalency to which each element or step thereof is entitled.

What is claimed:
1. An improved card holder for meter readers comprising:
   a housing having a portion thereof of dimensions to hold a stack of meter cards, the housing having means for extracting cards therefrom and inserting cards therein, the housing including a top having openings therein through which the user may write upon the uppermost card in said stack;
   a pair of spaced apart metallic members affixed to a portion of the exterior of said housing;
   a battery carried within said housing;
   high voltage producing means carried within said housing having the output thereof connected to said metallic members; and
   a switch means connected between said battery and said high voltage producing means, whereby when said switch is turned on high voltage is applied across said metallic members, such high voltage being useful in warding off an attacking animal.

2. An improved card holder for meter readers according to claim 1 wherein said housing has opposed side walls, and including:
   a handle extending from one side wall, said switch means being mounted in said handle, and said metallic members being affixed at least in part on the exterior of the other side wall.

3. An improved card holder for meter readers according to claim 1 wherein said housing includes:
   a first portion and a second portion, said first portion being of dimensions to hold a stack of meter cards, therein said first portion having opposed side walls; and
   a second portion detachably affixed to said first portion at one of said side walls, said second portion having said battery and said high voltage producing means therein.

4. An improved card holder for meter readers according to claim 3 wherein said housing second portion includes:
   a handle extending from the side thereof opposite the side engaged by said first housing portion when the portions are assembled, said switch means being mounted in said handle.

* * * * *